United States Patent [19]
Mikulicz et al.

[11] Patent Number: 5,558,484
[45] Date of Patent: Sep. 24, 1996

[54] APPARATUS FOR DISPENSING PARTICULATE MATERIAL

[75] Inventors: Michael Z. Mikulicz, Inverness; Serge Gurevich, Chicago, both of Ill.

[73] Assignee: UOP, Des Plaines, Ill.

[21] Appl. No.: 430,645

[22] Filed: Apr. 28, 1995

Related U.S. Application Data

[63] Continuation-in-part of Ser. No. 168,494, Dec. 22, 1993, abandoned.

[51] Int. Cl.$^6$ ................................................ B65G 69/04
[52] U.S. Cl. .................... 414/301; 414/786; 239/681; 239/689; 239/679
[58] Field of Search ........................ 414/293, 294, 414/288, 287, 300, 301, 302, 397, 160, 195, 786; 222/410; 239/681, 689, 679, 650, 668, 684; 141/312; 422/219

[56] References Cited

U.S. PATENT DOCUMENTS

| | | |
|---|---|---|
| 3,285,438 | 11/1966 | Howell et al. . |
| 3,995,753 | 12/1976 | Millar et al. . |
| 4,300,725 | 11/1981 | Moherek ................................ 239/684 |
| 5,209,607 | 5/1993 | Wei et al. ................................ 406/66 |

FOREIGN PATENT DOCUMENTS 586844A   1/1983   Japan .

Primary Examiner—Frank E. Werner
Attorney, Agent, or Firm—Thomas K. McBride; John G. Tolomei; John G. Cutts, Jr.

[57] ABSTRACT

A dispensing apparatus for particulate matter which distributes the particulate matter, at substantially the same rate, uniformly across a given area. The apparatus is particularly suitable for dispensing particulate matter in a vessel having a centrally located vertical support member.

15 Claims, 4 Drawing Sheets

5,558,484

APPARATUS FOR DISPENSING PARTICULATE MATERIAL

CROSS REFERENCE TO RELATED APPLICATION

The present application is a continuation-in-part application of U.S. Ser. No. 08/168,494 filed Dec. 22, 1993, now abandoned, which is incorporated herein by reference.

FIELD OF THE INVENTION

The invention relates to a dispensing apparatus which distributes particulate matter uniformly across a given cross-sectional area. More particularly, this invention relates to an apparatus which is useful for loading catalyst particles in a reactor vessel which results in a uniform catalyst bed.

BACKGROUND OF THE INVENTION

In the past, particulate matter has been loaded into vessels or dispensed by what is commonly referred to as the "sock" method wherein a hopper having an attached hose extends to the bottom of the vessel or to the surface of the previously dispensed particulate matter. The hopper and hose are filled with particulate matter and the particulates are released at the bottom the hose by slowly raising the hose to thereby permit the particulate matter to flow through the hose. The resulting dispensed particulates are in the shape of a cone which, during the dispensing of particulates, can be distributed over the entire given area by raking.

Commercial catalytic reaction zone vessels or reactors varying in width or diameter from about 1 foot to about 15 feet or more, having a length from about 5 feet to about 70 feet or more are loaded by the hereinabove described "sock" technique. One of the problems that is associated with loading reactors by this method is that the catalyst bed can contain excessive voids which can, during the use of the catalyst, bring about catalyst settling problems or "slumping", localized hot spots during the exothermic reactions of reactants and the necessity to utilize increased reactor volume. In addition, the sock technique requires increased times for loading a reactor since the hose through which the catalyst enters the reactor has to be continually adjusted upwardly in order to allow catalyst to flow. In addition to the above method, catalyst can be continually added through a hopper suspended above the catalyst surface which also results in the formation of a cone-shaped pile of catalyst upon the catalyst bed. As in the above method, the catalyst cone can be distributed over the catalyst bed by raking.

The resulting settling of the catalyst can change the overall volume of the catalyst bed thereby producing damage to equipment such as thermowells which have been inserted into the reactor for temperature measurements. In addition, the settling of catalyst can reduce the surface of the catalyst bed to a level whereby the thermowell is not in contact with the catalyst, thereby not allowing the reaction temperature to be monitored during the course of a reaction. Excessive voids in a sock-loaded, or otherwise inefficiently loaded, catalyst bed cause poor gas, liquid or gas-liquid distribution through the bed. The maldistribution often requires decreased throughput or increased temperatures, since the resulting catalyst utilization is low and product specifications may not be met. Settling problems associated with sock-loaded beds may result in damage to other reactor internals, such as baskets, redistribution trays, catalyst supports and quench spargers.

An additional problem associated with the previous loading techniques is that for a given reactor volume the amount of catalyst which can be charged is determined by the final catalyst density. Thus, a means for increasing the bulk density of catalyst present in a reaction zone would allow for increased throughput of reactants at the same severity or the same throughput at lower severity. Thus, more severe reaction conditions and/or increased throughput can be obtained for a given reaction zone volume if an increase in bulk density of the catalyst can be achieved.

Subsequently, those skilled in the art have used various dispensing apparatus which have demonstrated improved loading of particulates into reactor vessels. These prior art loading devices performed reasonably well for vessels having open spaces without obstructions which would interfere with the positioning of the loading device in or above the vessel, or would prevent the uniform free-fall of the distributed particulate matter.

Therefore, the known dispensing apparatus are not suitable for loading particulate matter into vessels which have a center-pipe located generally along the center line of the vessel. Those skilled in the art have sought to find a loading apparatus which produces a densely and evenly loaded bed of particulate matter in a rapid and facile manner.

INFORMATION DISCLOSURE

U.S. Pat. No. 3,995,753 (Millar et al) discloses an apparatus for dispensing particulate matter into a vessel. This apparatus is primarily used in an upper or top portion of the vessel and supported by a man-way.

U.S. Pat. No. 5,209,607 (Wei et al) discloses an apparatus and process for feeding powder or dry solid catalyst into a flowing liquid stream. The apparatus includes a purging device for isolating a metering means from a liquid stream and process for injecting finely divided flowable powder or catalyst into a flowing liquid stream which in turn is fed into a reactor utilized for the production of polypropylene or polyolefins.

Japanese Publication 58-6844(A) discloses an apparatus for stacking grain in a bin by introducing the grain in a center pipe which serves as a container to supply grain to a rotating element having blades which direct the grain in a downwardly oblique direction through upper and lower skirts which are fastened to the rotating element. The grain is also directed downwardly in a vertical direction through a tubular aperture or pipe which is centrally located on the bottom of the rotating element. This apparatus is used to store grain in a vessel while achieving an uneven top surface of the stored grain. The downwardly oblique flow of grain results in an annular accumulation of grain whereby the grain is required to roll downhill to ultimately fill the vessel. The centrally vertical flow of grain produces another pile of grain whereby the grain is also required to roll downhill. The apparatus fails to achieve the distribution of particulate matter uniformly across a given cross-sectional area to thereby achieve a densely and evenly loaded bed of particulate matter. In addition, the apparatus is unsuitable for use when the vessel has a centrally located and permanently mounted structure which must be accommodated while achieving the desired densely and evenly loaded bed of particulate matter.

U.S. Pat. No. 4,300,725 (Moherek) discloses an apparatus for the distribution of material comprising a rotatable, vertically oriented, hollow delivery tube mounted for rotation about a vertical axis within a fixed housing and driven by means of a motor external of the tube. At its upper end, the tube has an inlet port for receiving particulate material and carrying it for distribution from its lower end by an integral system which includes apertures located in the tube's vertical walls and a deflection member or paddle at the base of the tube for radially impelling the material out of the tube through the apertures. The apparatus requires the use of a driving means because the structure of a flat horizontal plate in conjunction with vertical paddles would not otherwise operate to give a uniform, controlled distribution.

U.S. Pat. No. 3,285,438 (Howell et al) discloses an apparatus for achieving uniformity of distribution of solid particles. This apparatus uses vertically and horizontally oriented wheel assemblies to support and rotate a spreader.

SUMMARY OF THE INVENTION

The present invention is an apparatus which is attached to a generally vertical support member and is able to rotate and be drawn by a motor. The apparatus serves as a container for particulate material while the particulate material flows downwardly into one or more rotating discharge members from which the particulate material flows and is dispensed to a bed located below the apparatus.

A preferred embodiment of the present invention is an apparatus for dispensing particulate material which apparatus comprises a cylindrical bearing ring having a first bearing surface, a second bearing surface, a longitudinal axis and a radial axis. A container for the particulate material defines an annular space and incorporates a second bearing surface. A first roller is fixed relative to the container and is rotatable about the radial axis of the cylindrical bearing ring to support the container by contact with the first bearing surface. A second roller is fixed relative to the container and rotatable about the longitudinal axis of the cylindrical bearing ring to guide the container by contact with the second bearing surface of the cylindrical bearing ring. At least one discharge member extends downwardly from the container and in communication with the container. The discharge member defines an outlet for dispensing particulate material whereby the particulate material flows from the container through the discharge member and is dispensed through the outlet. The container is rotated relative to the bearing ring by a motor.

It is therefore an object of the present invention to provide an apparatus and process for loading particulate material into a vessel to produce a bed of particulate material which possesses a high apparent bulk density (ABD). The use of the present invention is particularly advantageous for loading vessels which have a permanently mounted center pipe which is considered an impediment for the known loading devices but serves in an unexpectedly useful way when used in conjunction with the apparatus of the present invention.

Another embodiment of the present invention is a method for loading particulate material into a vessel having a vertical longitudinally extended central member and distributing the particulate material, at substantially the same rate, uniformly across the area of the vessel by means of a dispensing apparatus comprising: (a) introducing the particulate material into the dispensing apparatus having an annular particle container adapted to surround said central member, defining an annular opening at one end for receiving particulate material into an upwardly directed end and an outlet at an opposite end for discharging particulate material below said annular opening; (b) rotating the annular particle container on a bearing ring encircling the central member and defining a bearing surface; and (c) discharging the particulate material through the outlet in the annular particle container into the vessel.

DETAILED DESCRIPTION OF THE INVENTION

Figure 1:
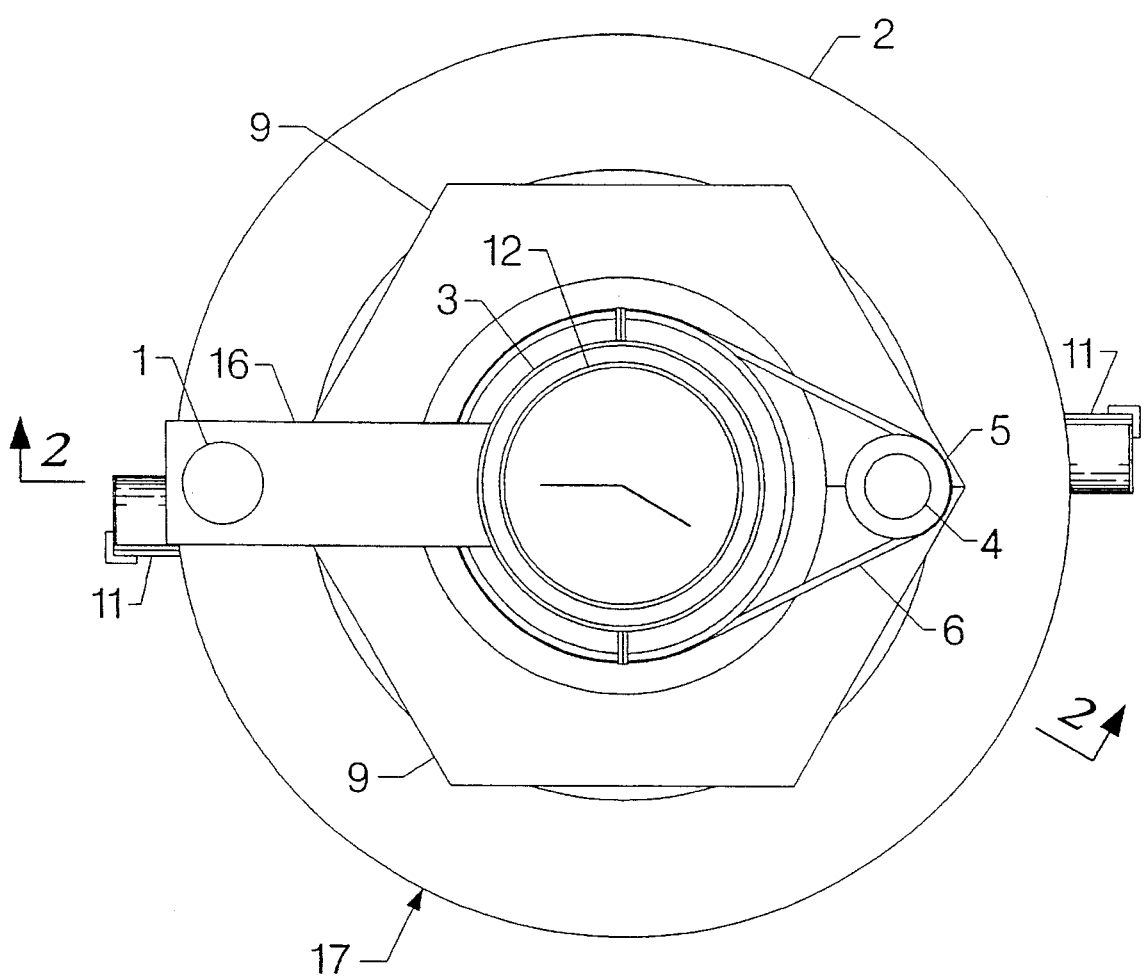
FIG. 1 is a top view of the particulate dispensing apparatus.

The present invention may be used to dispense most types of particulate matter which are typically loaded into vessels and any other confined spaces. A particularly advantageous use of the present invention is to load catalyst particles into a reactor vessel which has a permanently mounted center pipe located almost entirely along the vertical center line of the reactor vessel.

A particular advantage for the use of catalyst charged with the apparatus of the present invention is in various hydrocarbon conversion processes such as hydrogenation, reforming, hydrocracking, polymerization, hydrodesulfurization and dehydrogenation, for example, wherein such hydrocarbon conversion processes are carried out in a non-fluidized catalyst bed reactor, which includes fixed bed reactors and moving bed reactors. This invention is particularly advantageous with hydrodesulfurization, hydrocracking, hydrogenation and reforming processes. A particularly preferred application of this invention is with reforming and hydrogenation processes. The various process conditions of temperature, pressure and space velocity vary according to the process and such conditions include those well known to those skilled in the above-mentioned processes.

An additional advantage of increased bulk density of loaded catalyst is that catalyst life may be extended for the same throughput and severity. This extension of catalyst life is a result of the tangible effect of the increased weight of catalyst in a fixed reactor volume as well as the less tangible effect of uniform gas, liquid or gas-liquid distribution which coincides with the more uniform voidage of a densely-loaded catalyst bed. Longer catalyst life results in a longer unit run length.

Furthermore, dense loading of all reactors in an integrated refinery would provide a means for predicting, controlling and optimizing the occurrence of turnaround, based on the premise that catalyst life in each reactor of the refinery network would become a predictable function of tangible factors such as catalyst properties, throughput and operating severity. Intangible effects associated with maldistribution, settling and hotspots would be minimized by dense catalyst loading.

In a particularly preferred embodiment, the utilization of this particle dispensing apparatus provides for an improved reforming process wherein a reforming catalyst is charged to a reactor with the apparatus of the present invention; then hydrogen and a dehydrogenatable organic material, for example, a petroleum hydrocarbon, are contacted with the reforming catalyst and a reformed organic material is recovered. Thus, the reforming process provides for allowing more throughput at the same severity for a given reactor vessel and for greater catalyst weight per volume of reactor vessel. The increase in catalyst bulk density, therefore, allows for the construction and use of smaller and less expensive reactor vessels for a given throughput.

The apparatus of the present invention is used in one embodiment to charge catalyst particles to a reactor vessel in a downflow relationship to the reactor vessel. In general, reactor vessel sizes varying between about 1 to about 16 feet, preferably from about 2 to about 13 feet in diameter, and from about 5 to about 125 feet, more preferably from about 10 to about 75 feet in length can be charged. The rate of fill of the reactor vessel can be non-uniform. However, it is preferred that the rate of fill be uniform and that after a given rate of fill is established, this rate of fill be maintained while preparing the catalyst bed. The catalyst particles are introduced into the reactor vessel at a point such that the distance to the catalyst surface formed as the catalyst particles are introduced through a gaseous medium provides an average free fall distance of catalyst particles of at least about 1 foot, more preferably an average free fall distance from about 5 to about 125 feet and still more preferably from about 10 to about 70 feet. The gaseous medium in general is air or, depending on the catalyst, an inert medium such as nitrogen. Thus, in general, the catalyst particles fall individually to the catalyst surface as the catalyst bed is formed. The catalyst particles are distributed over the surface area of the catalyst bed as it is formed such that the catalyst surface raises at a substantially uniform rate. The catalyst particles are distributed in order to produce a substantially flat catalyst surface defined as a difference between the highest portion of the catalyst surface and the lowest portion of the catalyst surface which is less than 10 percent of the diameter of the catalyst bed, more preferably less than 5 percent and still more preferably less than 1 percent. One of the most commonly used configurations utilized as vessels or reactors is the vertical cylinder with a circular, horizontal cross-section. It is also contemplated that vessels having a horizontal cross-section other than circular may also be loaded with the apparatus of the present invention. However, the apparatus of the present invention is highly suitable for loading particulate matter into a circular vessel which has an annular horizontal cross-section having a fixed center pipe. The apparatus of the present invention may be used in conjunction with a removable conduit or structure as part of a loading operation.

The term "rate of fill" implies the rise in bed height and may be expressed with units of feet per hour (ft/hr). Another term, particle flux, is convenient to characterize the features of the loading speed and is defined as the pounds of catalyst particles dropped on an area of one square foot in one hour (lb/ft² hr). It has been found that there is a certain particle flux most favorable for optimal loading of a given catalyst. Particle flux and rate of fill are related by the catalyst loaded bulk density:

$$\frac{\text{Flux}, \frac{lb}{ft^2 - hr}}{\text{Loaded } ABD, \frac{lb}{ft^3}} = \text{Rate of Fill, ft}^2/\text{hr}$$

It is preferable that a flux between 100 and 1500 lb/hr-ft² is used for increasing the catalyst loaded bulk density, and that more preferable results are obtained for most catalysts using a flux between 300 and 1000 lb/hr-ft².

The above rates of fill, free fall distance, and uniform distribution of the catalyst within the above preferred ranges are preferred since they provide for approaching substantially the maximum bulk density achievable for a given catalyst bed. The reactor vessel sizes which are preferred are those reactors which, in general, are utilized in commercial processes such as hydrogenation, reforming and hydrocracking.

This invention is applicable to catalyst particles which are spheres, pills, extrudates, crystals and cylinders, for example. In general, the particle diameter should not be greater than 3% of the bed diameter and, preferably with a diameter from about 1/64 to about 1/2 of an inch, more preferably from about 1/16 to about 1/4 of an inch. Catalyst particle diameter refers to the nominal particle dimension in the case where the particle is not spherical.

A wide variety of solid catalysts may be charged to catalytic reaction zones with the apparatus of the present invention such as oxidation, hydrodesulfurization, hydrocracking, reforming and hydrogenation catalysts. The composition, preparation and other characteristics of such catalysts are well known to those skilled in the art of catalysis.

Commercial separation zone vessels are also suitably loaded with adsorbent particulates in a manner utilizing the dispensing apparatus of the present invention. Commercial separation zone vessels vary in width or diameter from about 1 foot to about 15 feet or more, and have lengths from about 5 feet to about 70 feet or more.

The apparatus of the present invention is preferably located in an upper locus of the vessel to be loaded with particulate matter and, of course, has an overall diameter less than the vessel to be loaded. The particle outlet(s) preferably have a total length as measured in a radial direction in the range from about 2% to about 50% of the diameter of the particle bed. In addition, the particle outlets preferably are generally tapered and have an increasing width in an outwardly extending direction. The minimum width of the particulate outlet(s) is preferably at least about 125% of the nominal diameter of the particles being distributed. The loading apparatus is preferably rotated at a speed sufficient to directly deposit at least some of the particles upon the outer periphery of the resulting bed of particles.

In the event that the apparatus of the present invention cannot be slipped over one end of the conduit, it is preferable that the apparatus is built in two semi-circular portions that can be separated to thereby provide for ease of installation.

Referring now to FIG. 1, particle dispensing apparatus 17 is particularly adapted to dispensing particulate matter into a vessel having a center pipe 12. A bearing ring 3 is removably attached to center pipe 12 in order to provide both horizontal and vertical support for particle dispensing apparatus 17 which includes annular particle container 2 which cooperates with shroud 9 to hold particulate matter before it is dispensed. The particulate matter enters particle dispensing apparatus 17 via particulate matter conduit 1 which is held in position by particulate matter inlet conduit support 16. Particle dispensing apparatus 17 is rotated around center pipe 12 with a drive belt 6 which is driven by sheave 5 and motor 4. Eventually, particulate matter is dispensed via particulate matter distributor 11.

Figure 2:
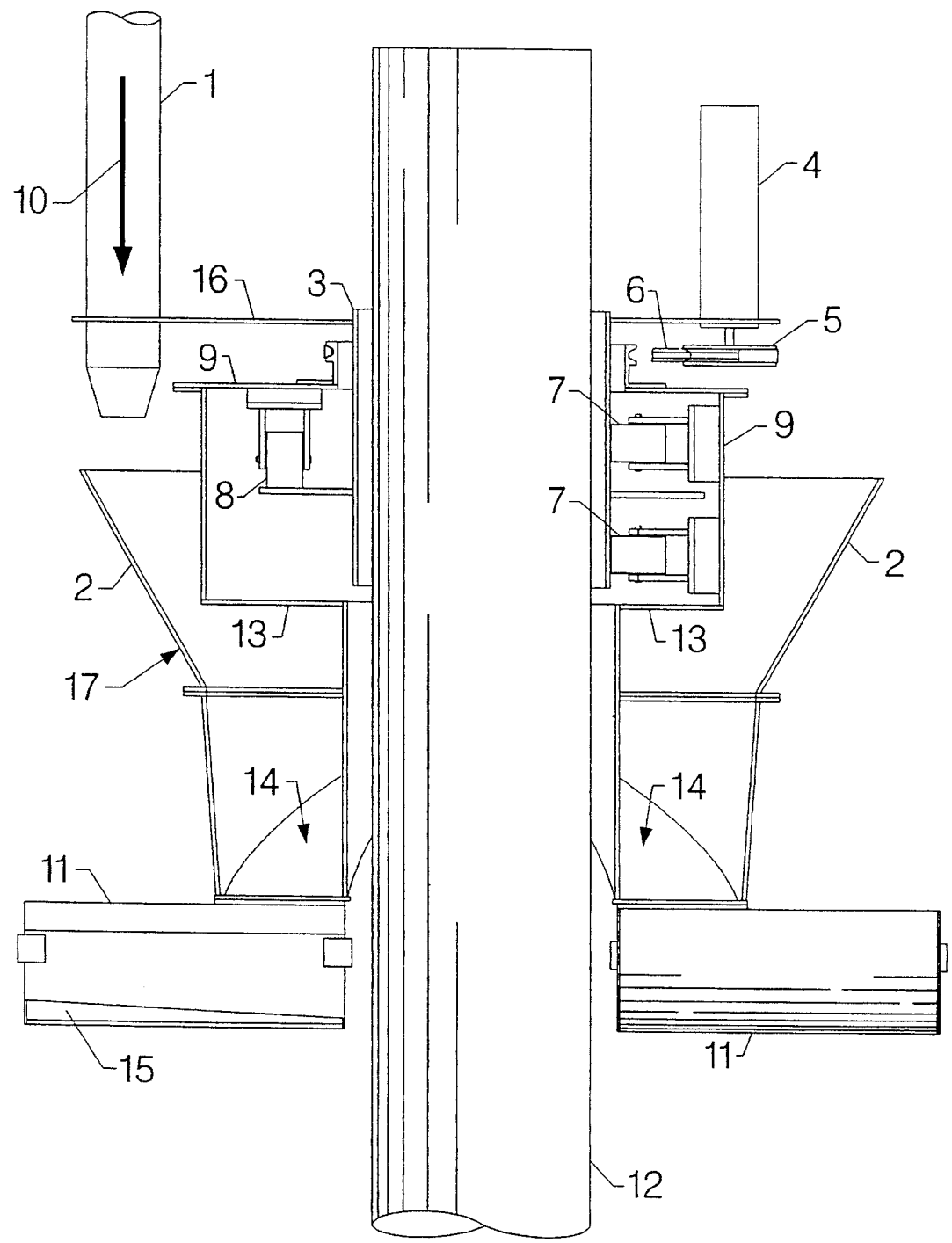
FIG. 2 is a section view taken across Section 2—2 of FIG. 1.

Referring to FIG. 2, a bearing ring 3 is removably attached to center pipe 12. Bearing ring 3 supports vertical load bearing casters 8 and provides alignment for horizontal load bearing casters 7. Vertical load bearing casters 8 and horizontal load bearing casters 7 are attached to shroud 9 to provide support for particle dispensing apparatus 17. Shroud 9 is attached to annular particle container 2 to hold particulate matter before it is dispensed. Shroud 9 also seals off load bearing casters 7 and load bearing casters 8 to prevent entry of particles. Annular particle container 2 has an upper plate 13 and a lower plate 14. Particulate matter distributors 11 are attached to the lower locus of annular particle container 2. Particulate matter distributors 11 have particulate matter distributor slots 15 located on the trailing edge of particulate matter distributor 11. The particulate matter enters particulate matter inlet conduit 1, which is supported by particulate matter conduit support 16, in a downward fashion as indicated by particulate matter flow direction 10. The flowing particulate matter passes into a revolving annular particle container 2 and then flows into particulate matter distributors 11. The particulate matter eventually is dispersed through particulate matter distributor slots 15. Particle dispensing apparatus 17 is rotated around center pipe 12 with a drive belt 6 which is driven by sheave 5 and motor 4.

Figure 3:
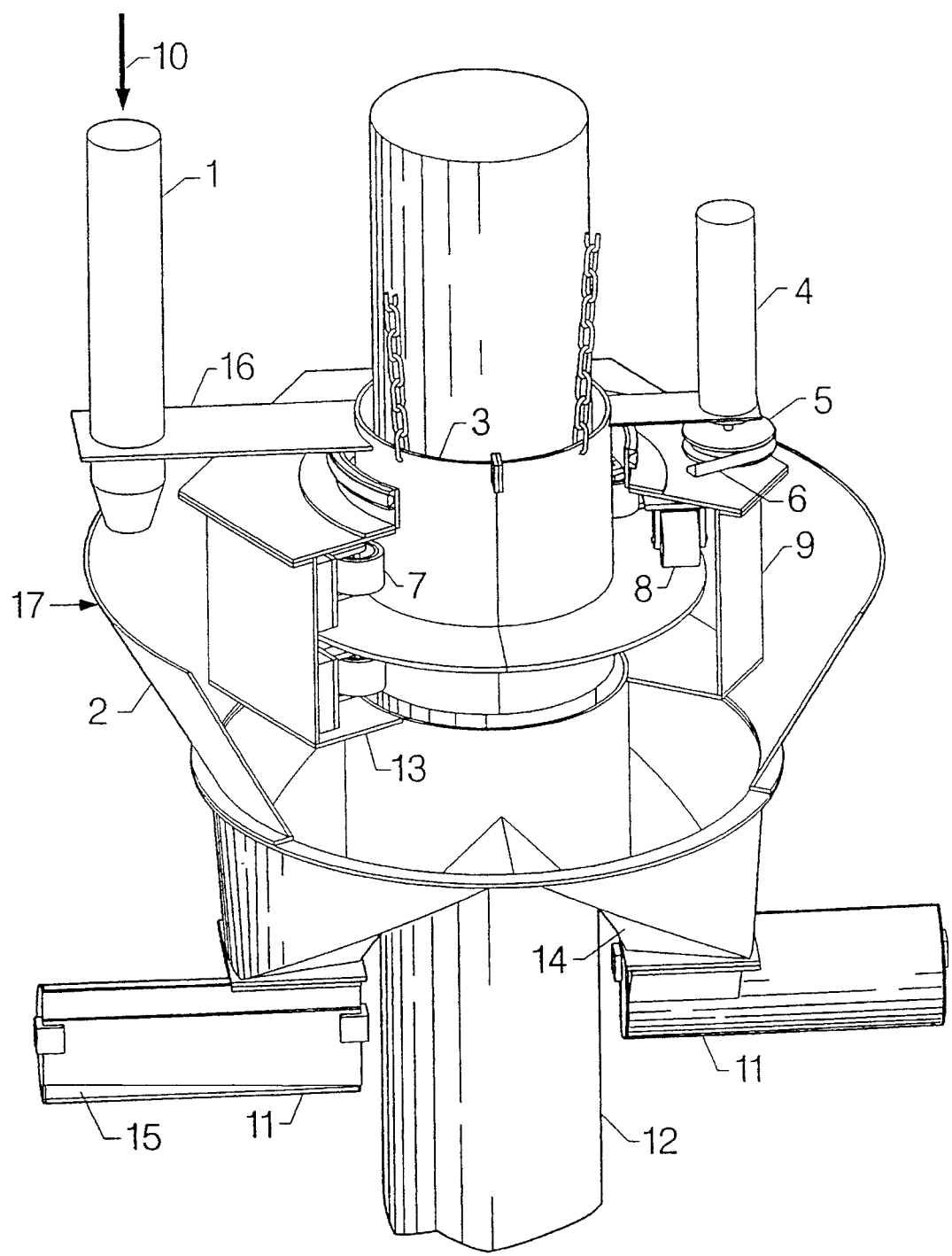
FIG. 3 is a cutaway isometric of the particulate dispensing apparatus.

FIG. 3 illustrates the same apparatus which is shown in FIG. 1 and FIG. 2, and the reference numbers are the same as previously used.

Figure 4:
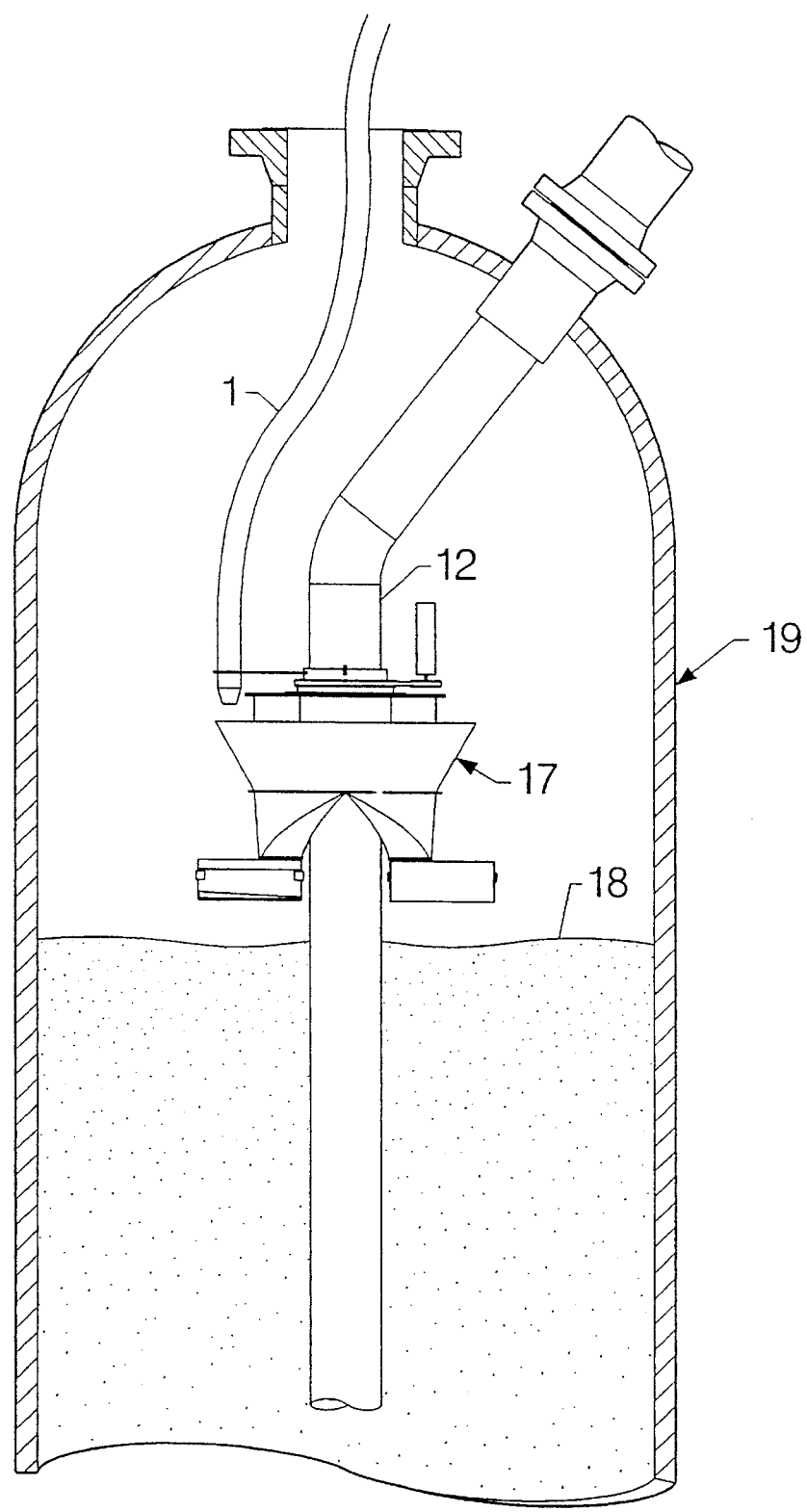
FIG. 4 is a schematic view of a vessel and the particulate dispensing apparatus.

Referring to FIG. 4, particle dispensing apparatus 17 is shown located in an upper locus of vessel 19 and attached to center pipe 12. Particulate matter inlet conduit 1 supplies particulate matter to particle dispensing apparatus 17 which is rotatable and dispenses particulate matter to bed 18.

The foregoing description and figures clearly illustrate the advantages encompassed by the apparatus of the present invention and the benefits to be afforded with the use thereof.

What is claimed:

1. An apparatus for dispensing particulate material onto a particle bed within a vessel having a vertical longitudinally extended central member, said apparatus comprising:

(a) a bearing ring encircling and supported by said central member and defining a bearing surface;

(b) particulate material dispensing means supported by said bearing ring, said dispensing means comprising an annular particle container adapted to surround said central member and defining an annular opening at one end for receiving particulate material into an upwardly directed end and an outlet at an opposite end for discharging particulate material below said annular opening;

(c) means for rotatably supporting said particulate material dispensing means from said bearing surface and restraining radial and longitudinal movement of said particulate material dispensing means relative to said bearing ring;

(d) particulate material feed means fixed to said central member and offset radially from the longitudinal axis thereof and adapted to feed particulate material to said annular opening of said annular particle container; and (e) means for rotating said particulate material dispensing means relative to said bearing ring.

2. The apparatus of claim 1 wherein said annular particle container comprises a subadjacent inclined surface, said subadjacent inclined surface having a slope that outwardly directs particulate material from the center of said annular particle container.

3. The apparatus of claim 1 wherein at least one horizontal particulate matter distributor arm is attached to the lower extremity of said annular particle container and said annular particle container includes an inclined surface which directly communicates particulate material from said annular particle container to said distributor arm.

4. The apparatus of claim 1 wherein said bearing ring comprises two separable semi-circular portions.

5. The apparatus of claim 1 wherein said outlet defines at least one aperture for discharging said particulate material.

6. The apparatus of claim 1 wherein said means to rotate said particulate material dispensing means is a motor.

7. The apparatus of claim 6 wherein said motor is a pneumatic motor.

8. The apparatus of claim 1 wherein said annular particle container comprises two separable semi-circular portions.

9. An apparatus for dispensing particulate material into a particle bed within a vessel having a vertical longitudinally extended central member which comprises:

(a) a bearing ring encircling and supported by said central member defining a vertical longitudinal axis radially offset from said central member and a horizontal radial axis;

(b) a first bearing surface fixed relative to said bearing ring;

(c) particulate material dispensing means supported by said bearing ring, said dispensing means comprising an annular particle container for said particulate material adapted to surround said central member and defining an annular space, an upwardly directed annular opening for receiving particulate material, a second bearing surface, and particle discharge means;

(d) a first roller fixed relative to said particulate material dispensing means and rotatable about said horizontal radial axis to support said particulate material dispensing means by contact with said first bearing surface;

(e) a second bearing surface fixed relative to said bearing ring;

(f) a second roller fixed relative to said particulate material dispensing means and rotatable about said vertical longitudinal axis to guide said particulate material dispensing means by contact with said second bearing surface;

(g) said particle discharge means extending downwardly from said annular particle container and in communication with said annular particle container, said particle discharge means defining an outlet for dispensing particulate material whereby said particulate material flows from said annular particle container through said discharge means and is dispensed through said outlet;

(h) particulate material feed means fixed to said central member and offset radially from the longitudinal axis thereof and adapted to feed particulate material to said annular opening of said annular particle container; and (i) means for rotating said particulate material dispensing means relative to said bearing ring.

10. The apparatus of claim 9 wherein said annular particle container comprises a subadjacent inclined surface, said subadjacent inclined surface having a slope that outwardly directs particulate material from the center of said annular particle container.

11. The apparatus of claim 9 wherein said bearing ring comprises two separable semi-circular portions.

12. The apparatus of claim 9 wherein said means for rotating said particulate material dispensing means comprises a motor.

13. The apparatus of claim 12 wherein said motor is a pneumatic motor.

14. The apparatus of claim 9 wherein said annular particle container comprises two separable semi-circular portions.

15. A method for loading particulate material into a vessel having a vertical longitudinally extended central member and distributing said particulate material, at substantially the same rate, uniformly across the area of said vessel by means of a dispensing apparatus comprising:

(a) introducing said particulate material into particulate material dispensing means rotatably supported by said central member and having an annular particle container adapted to surround said central member and defining an annular opening at one end for receiving said particulate material into an upwardly directed end and an outlet at an opposite end for discharging said particulate material below said annular opening, said particulate material introduced by means of particulate material feed means fixed to said central member and offset radially from the longitudinal axis thereof and adapted to feed said particulate material to said annular opening of said annular particle container;

(b) rotating said particulate material dispensing means on a bearing ring encircling said central member and defining a bearing surface; and (c) causing said particulate material to be discharged from said outlet into said vessel.

* * * * *